United States Patent [19]
Kühnlein et al.
[11] 3,912,990
[45] Oct. 14, 1975

[54] SPEED CONTROL ARRANGEMENT FOR A TWO REEL REWINDING APPARATUS

[75] Inventors: Hans Kühnlein, Nurnberg-Grossgrundlach; Georg Kögler, Schwabach; Rudolf Lanzendörfer, Rothenbach, all of Germany

[73] Assignee: Siemens Aktiengesellschaft, Munich, Germany

[22] Filed: Feb. 21, 1974

[21] Appl. No.: 444,655

[30] Foreign Application Priority Data

Feb. 28, 1973 Germany .......... 2310035

[52] U.S. Cl. .......... 318/7; 242/55.12
[51] Int. Cl.² .......... B65H 59/38
[58] Field of Search .......... 318/7; 248/55.12

[56] References Cited

UNITED STATES PATENTS

| | | | |
|---|---|---|---|
| 3,663,878 | 5/1972 | Myasaka | 318/331 X |
| 3,704,401 | 11/1972 | Miller | 318/7 |
| 3,716,769 | 2/1973 | Brunner | 318/331 X |
| 3,733,529 | 5/1973 | Ross et al. | 318/7 |

*Primary Examiner*—T. E. Lynch
*Attorney, Agent, or Firm*—Kenyon & Kenyon Reilly Carr & Chapin

[57] ABSTRACT

A speed control for a two reel rewinding apparatus of the type in which each reel is driven by a speed control motor and in which a common speed control circuit, preset for a fixed nominal value, is used to control both motors with an actual value signal being provided as an input to the speed control circuit, which actual value is derived from the sum of quantities proportional to the speed of the two motors.

4 Claims, 8 Drawing Figures

SPEED CONTROL ARRANGEMENT FOR A TWO REEL REWINDING APPARATUS

BACKGROUND OF THE INVENTION

This invention relates to speed control arrangements for two reel winding apparatus in general, and more particularly, to an improved speed control apparatus in which both motors are provided with common speed control circuits which can selectively be connected to either of the two motors.

Two reel rewinding arrangements are used for various applications such as for driving magnetic tape in audio recorders and also for magnetic tape units used in the computer industry. In each of these types of devices, a problem exists in that as a reel winds down, the speed of the unwinding reel tends to increase. Because of this, various arrangements have been developed to insure that the reel which is unwinding does not exceed a certain maximum speed.

One such arrangement is disclosed in German Offenlugungsschrift No. 2,136,684. In another arrangement disclosed in German Offenlugungsschrift No. 2,125,339, a speed control arrangement is disclosed wherein the speed of the rewind material is controlled so that it is at an almost constant value. To accomplish this, the control arrangement associated with whichever motor is driving, is provided with an actual value which is derived from the E.M.F. of that motor. The desired value provided to the control arrangement to which the E.M.F. of the driving motor is to be compared, is a signal which has been influenced by the E.M.F. of the other motor operating as a generator. That is, a desired value signal is operated on by the E.M.F. of the motor which is operating as a generator in such a manner that a difference is formed between a constant voltage and a voltage proportional to the generated E.M.F. In order to produce the voltage proportional to the E.M.F. and to find the difference between the fixed voltage and that voltage, this prior art arrangement requires high quality electronic amplifier elements.

Thus, although this known arrangement is effective, it is quite expensive and it is thus, evident that there is a need for an improved control arrangement which can provide the same accuracy of control through the utilization of simple electric and electronic building blocks.

SUMMARY OF THE INVENTION

The arrangement of the present invention provides these advantages. A single speed control circuit is provided along with means to selectively switch it to one or the other motors. This speed control circuit is provided with a fixed desired value and for comparison therewith is supplied with an actual value signal which is derived from the sum of quantities proportional to the speed of the two motors. The constant speed of the winding material can be improved in a simple manner by correcting at least one of the speed proportional quantities.

If the speed control arrangement is to be used with brushless d-c motors, in which motors a signal proportional to speed is taken off from the Y-connected stator windings of the motor through diodes, an embodiment may be used in which the diodes associated with a motor are connected to a common junction, i.e., one junction per motor, and each junction connected through a resistor network to the actual value input of the speed control circuit.

For operations where rewinding is carried out at a low speed, the E.M.F. induced in the stator windings of the motors is considerably small and in some cases may not be sufficient to drive the speed control arrangement. Thus, a further embodiment of the invention is illustrated in which the actual value signal obtained from the sum of the speeds is increased through the use of operational amplifiers.

Also shown are various arrangements including voltage dividers and voltage dependent resistors which allow the proportional quantities to be corrected in a simple manner to achieve a response closer to that desired. In the illustrated embodiment, Zener diodes are employed for use as voltage dependent resistors and a further embodiment shown in which the number of Zener diodes required is reduced through the use of decoupling diodes.

DETAILED DESCRIPTION OF THE PREFERRED EMBODIMENT

Figure 1:
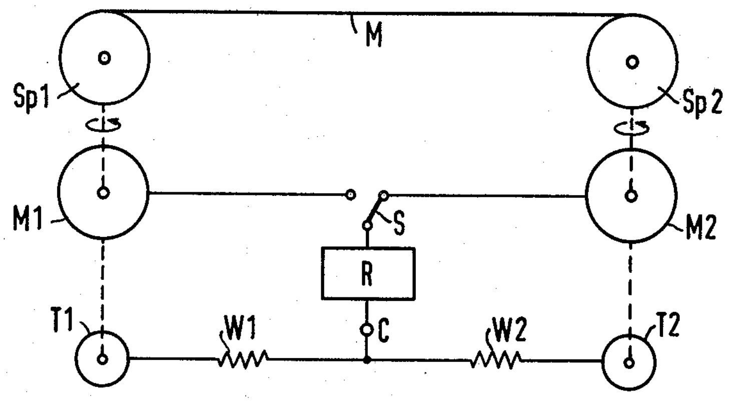
FIG. 1 is a block diagram of a speed control arrangement according to the present invention.

FIG. 1 illustrates in block diagram form a first embodiment of the present invention. As illustrated, first and second motors M1 and M2, each of which is of the type whose speed can be controlled, respectively drive reels designated SP1 and SP2. The reels will contain thereon a material such as a magnetic tape designated M. When rewinding, only one of the reels will be operated. A single speed control arrangement designated R is provided and has its output coupled through a single-pole double-throw switch to the two motors. Thus, one or the other motors, M1 or M2 can be selectively operated by properly setting switch S. As illustrated, switch S is set to operate the motor M2. Also coupled to each of the motors M1 and M2 is a tachometer designated as T1 and T2 respectively. In well known fashion, these tachometer's develop output voltages proportional to the speed of the motor to which they are coupled. The tachometer outputs are coupled respectively through resistors designated W1 and W2 to a terminal point C, which is at the input to the speed control circuit R. In this manner, as will be more fully described below, the sum of signals proportional to the speed of the two motors is provided as an input to the speed control circuit for use in developing an output signal which is provided through switch S to one of the motors, which output signal will maintain an essentially constant speed in the motor. Also, as will be more fully described below in connection with FIG. 2, the tachometer's T1 and T2 are used only as an example and other manners of obtaining voltages proportional to motor speed may equally well be used.

Figure 2:
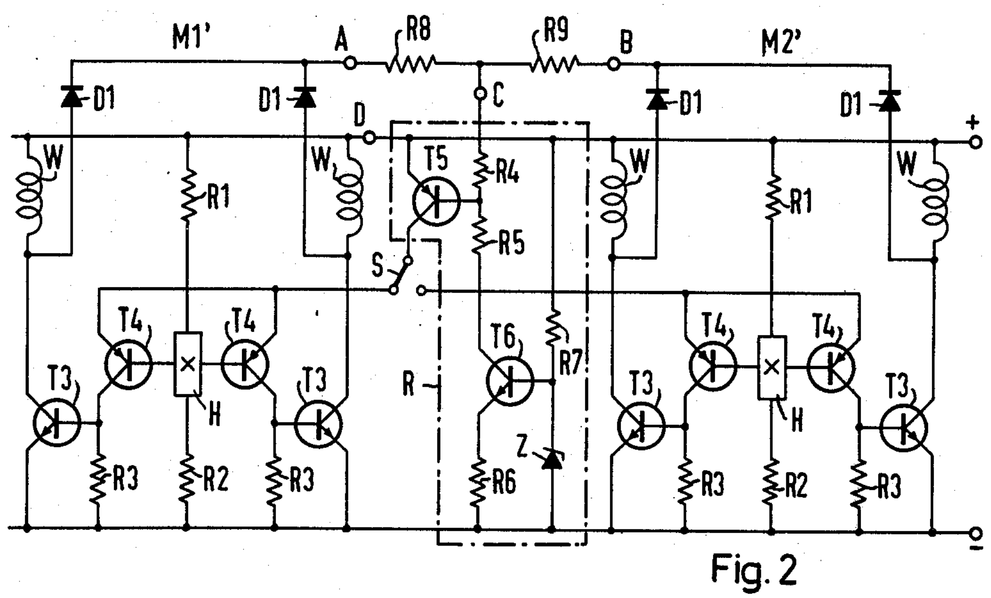
FIG. 2 is a circuit diagram illustrating a speed control arrangement such as that of FIG. 1 for use with a brushless d-c motor.

FIG. 2 is a schematic diagram illustrating the speed control of the present invention in combination with two brushless motors M1 and M2. For the sake of clarity, only those portions of the motor which are involved with the speed control circuit are shown. A more detailed schematic diagram showing a complete motor of this nature is contained in German Offenlugungsschrift No. 2,136,684. In FIG. 2, the corresponding parts of each motor are given identical reference designations. Thus, associated with each of the motors M1 and M2, there are shown two stator windings designated W. As shown, the stator windings of each motor are connected in a star configuration with the neutral points of the two motors coupled together at a terminal D, which terminal is also coupled to the positive voltage supply. The other end of each of the windings W is coupled through a power transistor T3 to the negative voltage supply. Each of the transistors T3 is controlled by an input transistor T4 which has its collector coupled through a resistor R3 to the negative voltage supply with the base input to the transistors T3 taken from the collector terminal. The base input to the transistors T4 are taken from Hall effect generators designated H, which are appropriately placed with respect to the rotor of the motor in well known fashion. Each Hall effect generator is coupled through a resistor R1 to the positive voltage supply and through a resistor R2 to the negative voltage supply. The emitters of the transistors T4 associated with motor M1 are coupled together and provided to one terminal of the switch S. Similarly, the emitters of transistors T4 associated with motor M2 are coupled together and provided to the other terminal of the switch S.

The end of each winding W which is coupled to a power transistor T3, is also connected to the anode of a take-off diode D1. The anodes of the diodes D1 associated with motor M1 are connected together at a terminal A. Similarly, the anodes of diodes D1 associated with motor M2 are coupled together at a terminal B.

In well known fashion, there will appear at points A and B respectively, signals proportional to the speed of their respective motors. The common speed control circuit of the present invention designated R is enclosed within the dot-dash lines. This speed control arrangement includes a regulating transistor T5 having its emitter coupled to the positive supply and its collector coupled to the common terminal of switch S. Transistor T5 has its base coupled through resistor R4 to a terminal point C which is the actual value input to the circuit. At the base of this transistor, the comparison of this actual value is made with a desired value which is provided through resistor R5 by transistor T6. Transistor T6 has its collector coupled through R5 to the base of transistor T5 and its emitter connected to the negative supply through resistor R6. A voltage divider comprising R7 and a Zener diode designated Z maintains a constant reference value at the base of transistor T6. In this way, a constant reference value is always provided to the base of T5 for comparison with the actual value provided from terminal C through R4. In the embodiment of FIG. 2, the actual value at point C will be the sum of two signals representing functions of the respective rotor speeds of motors M1 and M2, with the respective terminals A and B coupled through resistors R8 and R9 to terminal C.

In FIGS. 3, 4, 5 and 6 different arrangements for insertion between the terminal points A, B and C of FIG. 2, and which provide various types of improved operation, will be described.

Figure 3:
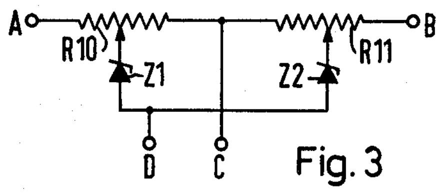
FIG. 3 illustrates a voltage divider arrangement for use in the embodiment of FIG. 2 in which Zener diodes are employed along with voltage dividers.

In the embodiment of FIG. 3, the resistors R8 and R9 of FIG. 2 are replaced with variable resistors R10 and R11 which have their wipers coupled through respective Zener diodes Z1 and Z2 to the terminal point D which is coupled to the positive voltage supply. As will be explained more fully below, the Zener diodes Z1 and Z2 act to limit the maximum voltage contributed by each of the motors to the summing junction terminal point C.

Figure 4:
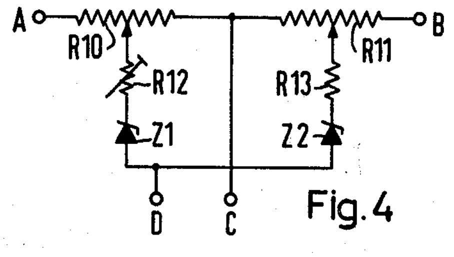
FIG. 4 illustrates a further resistor arrangement for use in the circuit of FIG. 2.

FIG. 4 is a modification of the embodiment of FIG. 3 which further includes resistors R12 and R13 in series with the Zener diodes Z1 and Z2. As indicated by R12, these resistors may be variable or, as indicated by R13, may be fixed. Their inclusion allows adjustment of the voltage present at the resistors R10 and R11 which will cause limiting by the respective Zener diodes.

Figure 5:
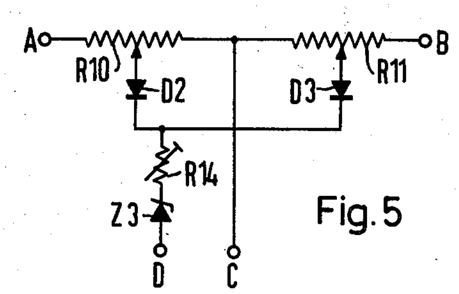
FIG. 5 illustrates a still further resistor divider and Zener diode arrangement.

FIG. 5 illustrates a further improvement over the embodiment of FIG. 4 which allows the use of only a single Zener diode Z3. Isolation diodes D2 and D3 are provided in the lines from the wipers of the resistors R10 and R11 with the cathodes of the diodes coupled together and to a variable resistor R14, in series with the Zener diode Z3. With this arrangement, only a single variable resistor and single Zener diode are required.

Figure 6:
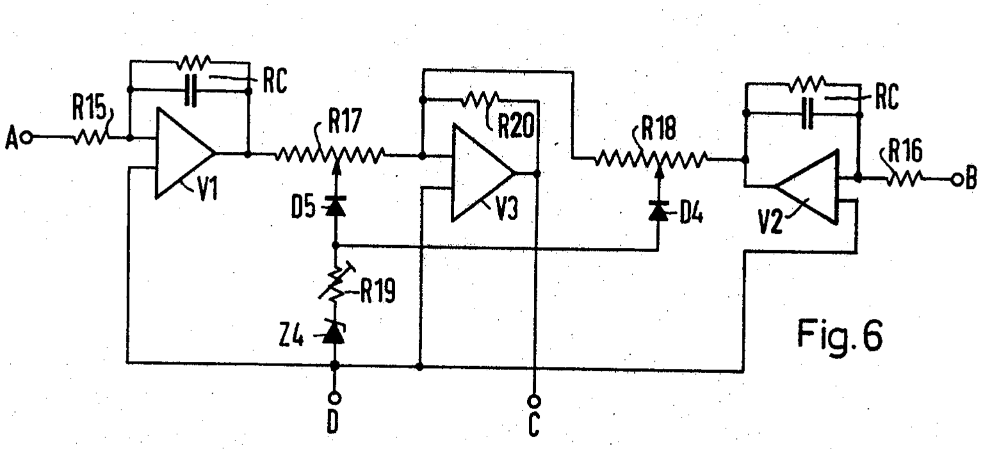
FIG. 6 illustrates an arrangement particularly adapted to use in low speed operation in which amplifiers are employed to increase the actual value signal.

FIG. 6 illustrates an embodiment particularly useful when low speed operation is required. A first amplifier V1 has its one input coupled through a resistor R15 to the terminal point A. As illustrated, amplifier V1 employs an RC circuit designated RC in its feedback path. In similar fashion, terminal B is coupled through a resistor R16 to the input of an amplifier V2 which also has a feedback circuit RC associated therewith. The outputs of amplifiers V1 and V2 are coupled respectively through resistors R17 and R18 to the input of a third inverting amplifier V3, having a feedback resistor R20. The output of amplifier V3, which will be the sum of the inputs obtained respectively from resistors R17 and R18, is then provided to the terminal point C. R17 and R18 have their wipers coupled respectively through diodes D5 and D4 to the series circuit comprising variable resistors R19 and Zener diode Z4 which is coupled to the positive voltage at terminal point D. The second inputs of each of the amplifiers V1, V2 and V3 are also coupled to the terminal point D as indicated.

Figure 7:
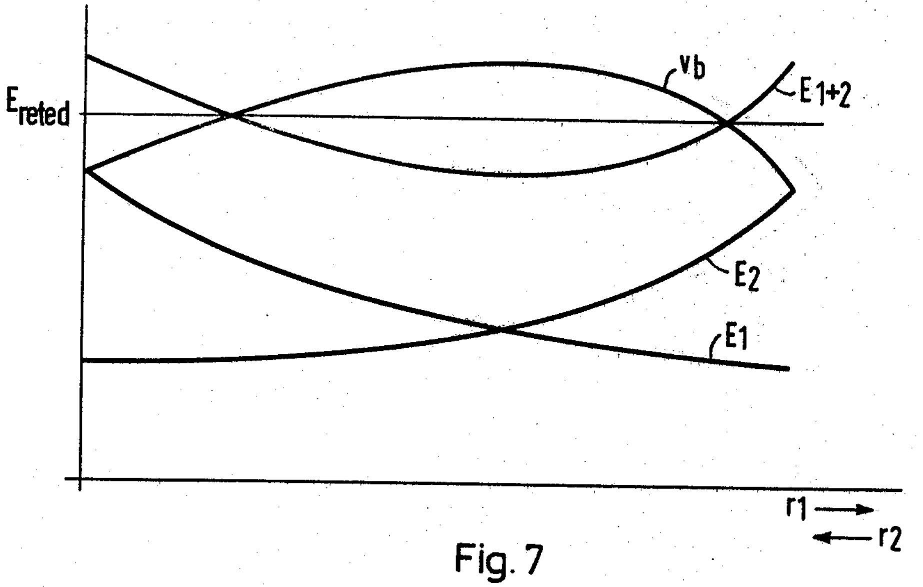
FIG. 7 is a waveform diagram illustrating various voltages obtained when employing the embodiment of FIG. 2.
Figure 8:
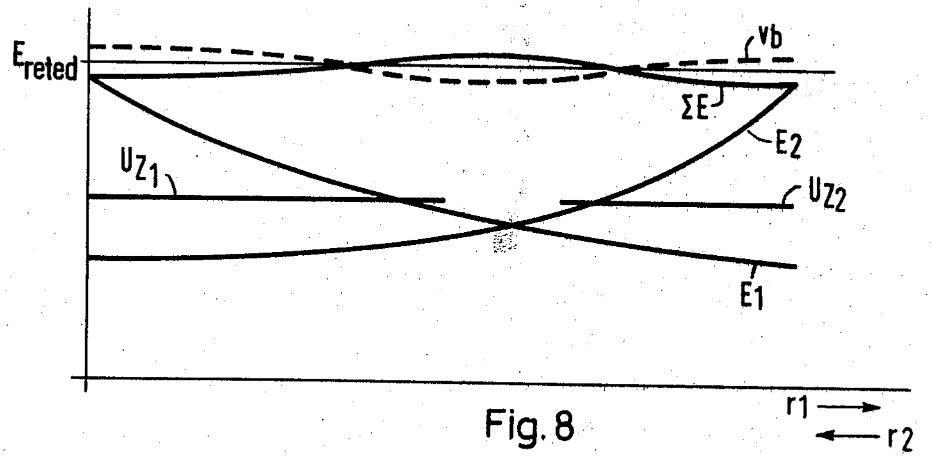
FIG. 8 is a similar waveform diagram illustrating operation of the embodiment of FIG. 3.

FIGS. 7 and 8 are waveform diagrams illustrating the operation of the various embodiments of the present invention. In FIG. 7, a constant speed of the rewind material is assumed. For this constant rewind speed, the voltage E1 denoting the E.M.F. of the take-up motor and the voltage E2 denoting the E.M.F. of the unwinding motor are shown. Also shown is the sum of these voltages designated $E_{1+2}$, i.e., this is a voltage which would appear at the terminal C of FIG. 2. The actual speed of the winding material which is achieved through the control arrangement of FIG. 2 is illustrated by the curve designated $V_b$.

FIG. 8 similarly has curves corresponding to the voltages E1 and E2 and a line designated $E_{rated}$ indicating the rated or desired value. In addition, the Zener voltages of Zener diodes Z1 and Z2 of FIG. 3 are also shown and designated respectively as $U_{z1}$ and $U_{z2}$. The curve designated as $\Sigma$ E at the left-hand portion represents the sum of the Zener voltage $U_{z1}$ and the E.M.F. $E_2$, since the E.M.F. $E_1$ will have been limited in this portion by the Zener diode voltage. In the center portion, the sum represents the sum of the voltages $E_1$ and $E_2$ and in the left-hand portion, represents the sum of the voltages $U_{z2}$ and $E_1$. Here on the right hand portion, the Zener diode D2 is limiting the voltage $E_2$. The dashed curve $V_b$ illustrates the actually achieved speed. It can be seen that the inclusion of the Zener diode arrangement of FIG. 3 causes this curve to more nearly approach the desired characteristic designated by $E_{rated}$.

Returning to FIG. 7, the operation of the speed control arrangement will be further described. The relationship between the speed $n$ of the respective take-up reel and the speed $v$ of the winding material is given by the following equation:

$$n = \frac{30 \cdot v}{\pi \cdot r}$$

where $r$ is the radius of the winding material on the take-up reel. If, in this equation, the speed $v$ is assumed to be constant, then the speed $n$ is inversely proportional to the radius $r$ of the take-up reel. The speed $n$ and thus, also the E.M.F. induced in the motor, which E.M.F. is proportional to speed, will therefore follow a hyperbolic shape. Thus, with constant speed during the entire rewinding process the shapes of the curves $E_1$, $E_2$ and $E_{1+2}$ shown on FIG. 7 will result. In order to maintain an exactly constant speed for the winding material, the speed control arrangement must then obtain a desired value corresponding exactly to the sum curve designated $E_{1+2}$. In accordance with the present invention, instead of having such a variable desired value, a constant desired value designated $E_{rated}$ is provided as an input to the control arrangement described above. As noted, this is accomplished in a simple manner through the use of the Zener diode Z associated with the transistor T6. Through this presetting of the constant desired value $E_{rated}$, the speed control arrangement of the present invention controls the speed in such a manner that it is maintained at the beginning and the end of the rewinding processes at a definite amount below the average speed established by the constant desired value while in the middle portion of the rewind process, it goes above this desired value by about the same amount. For the situation illustrated by FIG. 7, the deviation is approximately 12 percent assuming the ratio of the diameter of the empty reel to the diameter of the full reel to be 1:2.5.

As indicated above, when Zener diodes Z1 and Z2 such as those in the embodiment of FIG. 3 are used, a curve such as that of FIG. 8 results. As was indicated in the range where the E.M.F. curve E1 is above the Zener voltage $U_{z1}$ of Zener diode Z1, the shape of the sum curve $\Sigma$ E is determined by the flat shape of the E.M.F. curve E2 and the Zener voltage $U_{z1}$. Likewise, in the area where the E.M.F. curve E2 is above the Zener voltage $U_{z2}$ of Zener diode Z2, the E.M.F. curve E1 and the Zener voltage Z2 determine the shape of the curve $\Sigma$ E. In the center area where both E.M.F. curves E1 and E2 are below the Zener voltages, the two curves E1 and E2 determine the shape of the sum curve $\Sigma$ E. As noted above, this curve deviates only slightly from the constant rated value $E_{rated}$. As a result, there is only a slight deviation of the actual speed from that defined by the line designated $E_{rated}$. With an arrangement such as that in FIG. 3, this speed deviation from $E_{rated}$ can be limited to $\pm 5$ percent. Thus, with a simple component, a speed which nearly approaches the desired speed is achieved resulting in a significant improvement over the prior art devices available.

The resistors R12 and R13 in series with Zener diodes Z1 and Z2, as illustrated by FIG. 4, are used to change the limiting characteristics of these respective Zener diodes. Through appropriate adjustment of these resistors, further flattening of the sum curve $\Sigma$ E can be obtained, so that it more nearly approaches a constant desired value. The same can be achieved with the arrangement of FIG. 5 which, as noted above, eliminates one resistor and one Zener diode through the use of isolation diodes D2 and D3. This simplifies the adjustment of the sum curve requiring the adjustment of only a single resistor.

As also mentioned above, the amplifier arrangement of FIG. 6 permits amplifying the voltages at terminals A and B in cases where the E.M.F. obtained from the stator windings of the motors is below a value needed for reliable control. Such can result at low speeds which occur, for example, during the readout operation of a magnetic tape in a computer or the like. Through the use of the amplifier arrangement of FIG. 6, the type of speed control described above is possible, even at low speeds.

The major portion of the above description has been directed to the operation of the speed control arrangement of the present invention with brush-less d-c motors, whose stator windings provide an E.M.F. proportional to the respective motor speed through a take-off diode. It should be noted, that the speed control arrangement of the present invention may also be used with other types of motors with the speed proportional quantity obtained using other means such as the tachometer described in connection with FIG. 1. In such a case, as illustrated thereon, the tachometer or other signal is applied to the actual value input of the speed control circuit.

For certain applications, it may be advantageous to combine the different types of arrangements for forming a sum described in the various embodiments. In a case where widely different speeds must be controlled such as for read-out operation and rewind operation, a combination of an amplifier circuit and a straight resistor circuit is advantageous. Through such a combination, overdriving of the amplifiers due to high E.M.F.'s during rewind is avoided, while at the same time, maintaining good control at low speed operations. Through proper adaptation of the combined configurations, a large saving in components can be obtained as compared to the components which would be necessary in construction individual circuits for different purposes.

These and other modifications may be made without departing from the spirit of the invention, which is intended to be limited solely by the appended claims.

What is claimed is:

1. A speed control arrangement for rewinding apparatus having two reels with each reel driven by an associated speed controllable brush-less d-c motor having star connected stator windings comprising:

a. means to develop first and second signals proportional respectively to the speeds of the two motors including take-off diodes coupled to the stator windings of said motors, with each take-off diode associated with a motor coupled to a common junction point;

b. means to sum said first and second signals to develop a third signal including:

a first resistor having a wiper associated therewith which forms a tap thereon and having one side coupled to the common junction point of the diodes associated with one motor;

a second resistor having a wiper associated therewith which forms a tap thereon and having one end coupled to the common junction point of the diodes associated with the other motor;

said first and second resistors having their other ends coupled together to provide at said point of coupling said third signal;

and means for coupling the taps of said first and second resistors to the neutral point of the stator windings including isolation diodes and a series circuit comprising a voltage dependent resistor and an adjustable resistor, said series circuit being coupled to the taps on said first and second resistors through said isolation diodes;

c. means to generate a fourth signal representing a constant desired speed;

d. a speed control circuit having said third and fourth signals respectively as actual value and desired value inputs and responsive to said signals to provide an output proportional to the difference therebetween; and e. means to selectively couple the output of said speed control circuit as the speed control input to one or the other of said two motors.

2. A control arrangement according to claim 1 wherein said voltage dependent resistor is a Zener diode.

3. A control arrangement according to claim 1 and further including first and second amplifiers coupling said first and second junction points to said first and second resistors and a third inverting amplifier coupling the junction of said first and second resistors to the actual value input of said speed control circuit.

4. A control arrangement according to claim 3 wherein said voltage dependent resistor is a Zener diode.

* * * * *